(12) United States Patent
Wallace et al.

(10) Patent No.: US 8,939,419 B2
(45) Date of Patent: Jan. 27, 2015

(54) MULTI-LAYER IMPACT RESISTANT BUMPER

(75) Inventors: James S. Wallace, Lynnfield, MA (US); Lawrence A. Ellis, Wakefield, MA (US)

(73) Assignee: Boston Retail Products, Inc., Wakefield, MA (US)

( * ) Notice: Subject to any disclaimer, the term of this patent is extended or adjusted under 35 U.S.C. 154(b) by 548 days.

(21) Appl. No.: 13/114,402

(22) Filed: May 24, 2011

(65) Prior Publication Data

US 2011/0284710 A1    Nov. 24, 2011

Related U.S. Application Data

(60) Provisional application No. 61/347,661, filed on May 24, 2010.

(51) Int. Cl.
| | | |
|---|---|---|
| A47B 95/00 | (2006.01) | |
| F16F 3/093 | (2006.01) | |
| B32B 7/02 | (2006.01) | |
| E04F 19/02 | (2006.01) | |

(52) U.S. Cl.
CPC . F16F 3/093 (2013.01); B32B 7/02 (2013.01); E04F 19/026 (2013.01)
USPC .................................................... 248/345.1

(58) Field of Classification Search
USPC ................ 248/345.1, 615; 49/460, 462
See application file for complete search history.

(56) References Cited

U.S. PATENT DOCUMENTS

| | | | | |
|---|---|---|---|---|
| 4,946,727 A * | 8/1990 | Kessler | ............................ | 428/99 |
| 5,149,569 A * | 9/1992 | McCue | ............................ | 428/31 |
| 5,283,096 A * | 2/1994 | Greenberg et al. | ............. | 428/67 |
| 6,543,738 B2 * | 4/2003 | Smith | ......................... | 248/345.1 |
| 7,770,861 B2 * | 8/2010 | Huxtable et al. | ............ | 248/345.1 |
| 8,153,242 B2 * | 4/2012 | Wallace | ......................... | 428/217 |
| 8,337,971 B2 * | 12/2012 | Yaver | ............................ | 428/99 |
| 2005/0005565 A1 * | 1/2005 | McSharry et al. | ............ | 52/716.5 |
| 2005/0095413 A1 * | 5/2005 | Wallace | ......................... | 428/217 |
| 2008/0029676 A1 * | 2/2008 | Huxtable et al. | ............ | 248/345.1 |
| 2009/0022937 A1 * | 1/2009 | Wallace | ............................ | 428/99 |

* cited by examiner

*Primary Examiner* — Katherine Mitchell
*Assistant Examiner* — Scott Denion
(74) *Attorney, Agent, or Firm* — Novak Druce Connolly Bove + Quigg LLP

(57) ABSTRACT

An impact absorbing and resistant bumper comprising:
an elongated body comprised of at least two extruded or molded layers of polymeric materials, the elongated strip having a longitudinal axis and being resistant to impact, the elongated strip comprising:
a first body layer comprised of a first polymeric material having a first selected degree of hardness;
a second layer of a second polymeric material having a second degree of hardness;
the first body layer being extruded or molded such that it has a configuration taken along a section transverse or radial to the longitudinal axis that comprises a center aperture and a pair of recesses laterally adjacent the center aperture and extending along and through the longitudinal length of the elongated body.

24 Claims, 4 Drawing Sheets

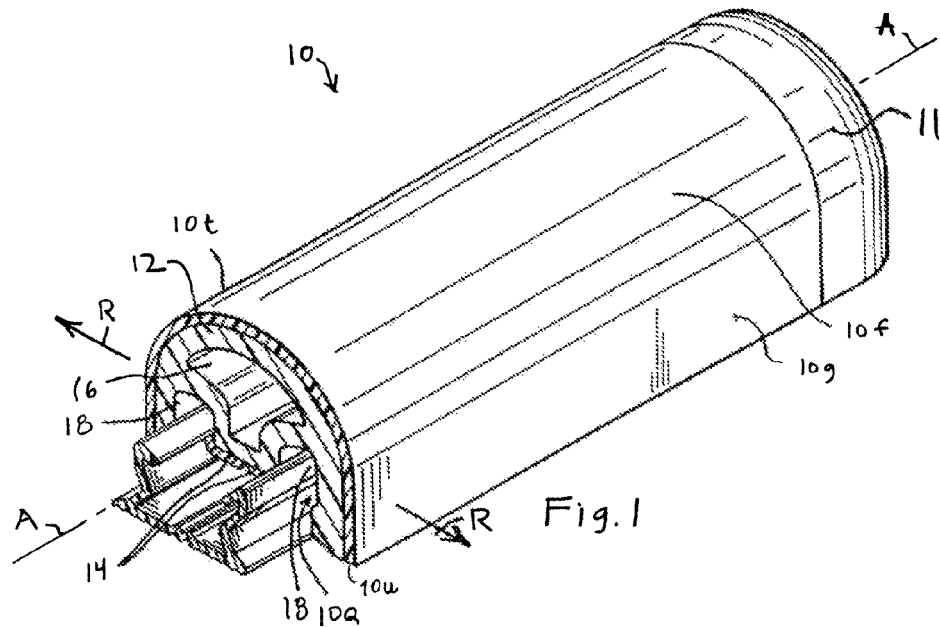
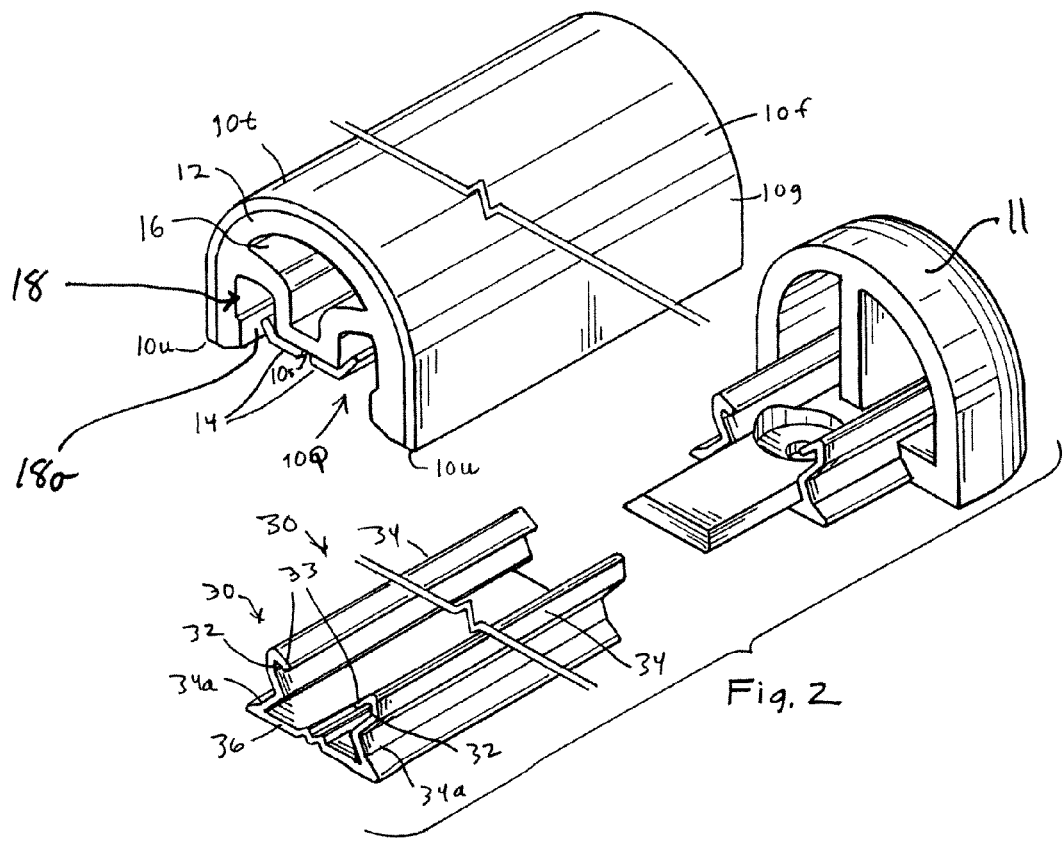
Fig. 1
Fig. 2

MULTI-LAYER IMPACT RESISTANT BUMPER

This application claims the benefit of priority to U.S. Provisional Application Ser. No. 61/347,661 filed May 24, 2010.

FIELD OF THE INVENTION

The present invention relates to impact resistant bumper products and more particularly to extruded or molded multi-layered products comprised of polymeric material and methods for producing such products. The invention further relates to elongated strip-like product comprised of layers of material having a different selected durometers, hardnesses, bendability, impact resistance, melting point and/or content or concentration of dye and/or plasticizer materials.

BACKGROUND OF THE INVENTION

Elongated strips comprised of impact resistant materials are typically extruded or injection molded out of polymeric materials that have insufficient resistance to shrinkage along the longitudinal axis of the products or that are unable to be mounted around sharp turns or edges without causing such extreme deformation in the body of the product that the aesthetic appearance of the product becomes distorted or unacceptable or the ability of the product to remain attached or affixed to the base on which the product is mounted is sacrificed. Processing methods for producing products comprised of polymer materials are typically developed by trial and error experimentation with a variety of different polymer materials having specific properties and molecular weights which, once determined are specific to production of the desired product and cannot be varied without substantially changing the impact resistance, bendability and attachability of the end product.

SUMMARY OF THE INVENTION

The present invention relates to elongated strips of multi-layered polymeric products that comprise a body of two or more polymer materials adhered or bonded to each other each polymer material having a different durometer, hardness, bendability, molecular weight or melting point or concentration or content of dye or plasticizer material such as disclosed in U.S. published application no. U.S. 2005/0095413 the disclosure of which is incorporated herein by reference. The elongated strip products of the invention are preferably formed as a multi-layered strip of polymer materials which is/are resistant to impact by solid objects and/or shock absorbent, resistant to shrinkage along the longitudinal or axial direction/length of the strip-form product and have the ability to be bent along the length of their longitudinal axes around a corner or curved edge having a bend radius of up to as little as at least about 2.5 inches, typically up to as little as at least about 1.5 inches and preferably up to as little as at least about 1.0 inches. The plasticizers used in the body of the strip product typically comprise one or more of phthalate, adipate and polymeric plasticizers. Typical phthalate plasticizers are di-isoheptyl, di-isononyl, di-isodecyl, di-isoudecyl, di-isotridecyl, di-alkyl and butyl benzyl phthalate. Typical adipate plasticizers are di-isonyl and di-isodecyl adipate.

In accordance with the invention there is provided an impact absorbing and resistant bumper for mounting on a base structure, the bumper comprising:

at least two extruded or molded layers of polymeric materials formed into an elongated body having a longitudinal axis and being resistant to impact, the elongated body comprising:
a first body layer comprised of a first polymeric material having a first selected degree of hardness;
a second layer of a second polymeric material having a second degree of hardness that is greater than the first degree of hardness of the material of the first body layer;
wherein the layers are extruded or molded simultaneously and adhered to each other to extend along the elongated axis of the body, the elongated body having a body configuration taken along a section transverse or radial to the longitudinal axis that forms an enclosure having a continuous curved outer surface and an open undersurface accessible for reversibly attaching to a base;
the first body layer having a configuration taken along a section transverse or radial to the longitudinal axis that has a transverse center, a stable transverse width when the elongated body is in a relaxed state and includes an enclosed center aperture embedded within the first body layer and a pair of open recesses embedded within the first body layer that are disposed laterally adjacent the center aperture, the aperture and recesses extending longitudinally along the longitudinal axis of the elongated body;
the second layer being disposed on a distal undersurface of the first body layer and formed into a configuration that is readily attachable to and detachable from a complementary receiving groove formed in the base.

The center aperture and the lateral recesses have a selected size and configuration and are disposed within and through the first body layer in an arrangement selected to enable the elongated body to be deformed or bent along a selected length along its longitudinal axis without deforming the first or second layers along the selected length to a degree that would cause the second layer to detach from the base along the selected length of the longitudinal axis.

The center aperture and the lateral recesses preferably have a selected size and configuration and are disposed within and through the first body layer in an arrangement that are selected to enable the elongated body to be deformed or bent along a selected length along its longitudinal axis into a bent portion having a bend radius of curvature of up to as little as at least about 2.5 inches at a bend angle of about ninety degrees wherein the bent portion can remain attached to the base at the bend angle of about ninety degrees with the bend radius of up to as little as at least about 2.5 inches (typically up to as little as up to about 1.5 inches, preferably up to as little as about 1.0 inches).

Bend radius is measured and defined by the distance between a distally disposed and distally facing curved undersurface on the underside of a bent portion of a bumper that is bent to a ninety degree angle and the center of a circle having a circumference coincident with the distally facing curved underside surface of the bent portion of the elongated bumper.

The center aperture and the lateral recesses preferably have a selected size and configuration and are disposed within and through the first body layer in an arrangement that are selected to enable the elongated body to be deformed or bent along a selected length along its longitudinal axis into a bent portion having a bend radius of curvature of up to as little as at least about 2.5 inches (typically up to as little as at least about 1.5 inches, preferably up to as little as at least about 1.0 inches) at a bend angle of about ninety degrees, the bent portion having a stressed transverse width, wherein the stressed transverse width along the bent portion remains about the same as the stable transverse width when the elongated body is in a relaxed state. Most preferably the stressed tranverse width is no more than about 0.05 inches wider, and typically no more than about 0.03 inches wider, than the relaxed state transverse width.

The center aperture preferably has a configuration taken along a section transverse or radial to the longitudinal axis that is generally T-shaped having a widened head portion that is curved along a top end of the center aperture and a leg portion that extends distally from the head portion toward the distal undersurface, the lateral recesses being disposed within body layer on opposite lateral sides of the center aperture. The lateral recesses typically extend laterally or radially away from the transverse center of the bumper a greater distance than any portion of the center aperture extends.

The first body layer preferably contains a plasticizer in an amount of about 3% or greater by weight relative to the first polymeric material and is selected to impart a degree of hardness and bendability to the first body layer that enables the elongated body to be readily bent along its longitudinal axis.

The second layer of polymeric material typically contains less than about 3%, most preferably about 1% or less and typically about 0.3% or less by weight of a plasticizer and has a stiffness or rigidity that enables the second layer to engage with and snap fit securely into the complementary groove formed within the base without deformation or deterioration of the configuration of the second layer.

The bumper typically further comprises an outer layer comprised of third polymeric material, the outer layer being extruded onto and forming the curved outer surface of the elongated body. The third polymeric material preferably contains a plasticizer in an amount of about 3% or greater by weight. The third polymeric most preferably has not been melted prior to melting and extrusion together with the first and second polymeric materials.

The first polymeric material preferably comprises a polyvinyl chloride polymer that has been melted at least once prior to being extruded or molded into the elongated body.

The first polymeric material preferably comprises a polyvinyl chloride polymer that has been melted at least once prior to being extruded or molded into the elongated body, and, the third polymeric material preferably comprises a polyvinyl chloride polymer that has not been melted prior to being extruded or molded into the elongated body.

The first and third polymeric materials preferably contain a plasticizer in an amount of about 3% or greater by weight and selected to impart a degree of hardness and bendability to the first body layer that enables the elongated body to be readily bent along its longitudinal axis.

The second polymeric material typically contains less than about 1% of a plasticizer and has a stiffness selected to enable the second layer to snap fit securely into a complementary groove of the base and maintain the bumper attached to the base at a ninety degree angle having a bend radius of up to as little as about 2.5 inches and typically as little as about 1.5 inches and even as little as about 1.0 inches.

The first polymeric material preferably comprises at least about 80% and most preferably at least about 90% by weight of the elongated body.

In another aspect of the invention there is provided an impact absorbing and resistant bumper readily attachable to and detachable from a base comprising:

at least two extruded or molded layers of polymeric materials formed into an elongated body having a longitudinal axis and being resistant to impact, the elongated body comprising:
 a first body layer comprised of a first polymeric material having a first selected degree of hardness;
 a second layer of a second polymeric material having a second degree of hardness greater than the degree of hardness of the first polymeric material;
wherein the layers are extruded or molded simultaneously and adhered to each other along the elongated axis of the strip, the elongated body having a body configuration taken along a section transverse or radial to the longitudinal axis that forms an enclosure having a curved outer surface and an open undersurface accessible for reversibly attaching to a base;
 the first body layer having a configuration taken along a section transverse or radial to the longitudinal axis that has a transverse center, a stable transverse width when the elongated body is in a relaxed state and includes an enclosed center aperture embedded within the first body layer and a pair of open recesses embedded within the first body layer that are disposed laterally adjacent the center aperture, the aperture and recesses extending longitudinally along the longitudinal axis of the elongated body;
 the center aperture having a configuration that is generally T-shaped having a widened head portion that is curved along a top end of the center aperture and a leg portion that extends distally from the head portion toward the distal undersurface, the lateral recesses being disposed within body layer on opposite lateral sides of the center aperture;
 the second layer being disposed on a distal undersurface of the first body layer and formed into a configuration that mates with a complementary groove formed in the base such that the elongated body is reversibly attachable to and detachable from the base.

In such an embodiment the first layer typically contains a plasticizer in amount greater than about 3% by weight of the first layer and the second layer contains less than about 0.3% of plasticizer.

In such an embodiment the first layer typically comprises a polyvinyl chloride polymer that has been melted at least once prior being extruded or molded into the elongated body.

In such an embodiment, the center aperture and the lateral recesses have a selected size and configuration and are disposed within and through the first body layer in an arrangement that are selected to enable the elongated body to be deformed or bent along a selected length along its longitudinal axis into a bent portion having a bend radius of curvature of up to as little as at least about 2.5 inches at a bend angle of about ninety degrees wherein the bent portion can remain attached to the base at the bend angle of about ninety degrees with the bend radius of up to as little as at least about 2.5 inches (typically up to as little as up to about 1.5 inches, preferably up to as little as about 1.0 inches).

In such an embodiment, the center aperture and the lateral recesses preferably have a selected size and configuration and are disposed within and through the first body layer in an arrangement that are selected to enable the elongated body to be deformed or bent along a selected length along its longitudinal axis into a bent portion having a bend radius of curvature of up to as little as at least about 2.5 inches (typically up to as little as up to about 1.5 inches, preferably up to as little as about 1.0 inches) at a bend angle of about ninety degrees, the bent portion having a stressed transverse width, wherein the stressed transverse width along the bent portion remains about the same as the stable transverse width when the elongated body is in a relaxed state. Most preferably the stressed tranverse width is no more than about 0.05 inches wider, and typically no more than about 0.03 inches wider, than the relaxed state transverse width.

In such an embodiment the bumper typically further comprises an outer layer comprised of third polymeric material, the outer layer being extruded onto and forming the curved outer surface of the elongated body. The third polymeric material preferably contains a plasticizer in an amount greater than about 3% by weight. The third polymeric most preferably has not been melted prior to melting and extruded together with the first and second polymeric materials.

In another aspect of the invention there is provided an impact absorbing and resistant bumper for mounting on a base structure, the bumper comprising:

at least two extruded or molded layers of polymeric materials formed into an elongated body having a longitudinal axis and being resistant to impact, the elongated body comprising:

a first body layer comprised of a first polymeric material having a first selected degree of hardness;

a second layer of a second polymeric material having a second degree of hardness that is greater than the first degree of hardness of the first material;

wherein the layers are extruded or molded simultaneously and adhered to each other to extend along the elongated axis of the body, the elongated body having a body configuration taken along a section transverse or radial to the longitudinal axis that forms an enclosure having a continuous curved outer surface and an open undersurface accessible for reversibly attaching to a base;

the first body layer having a configuration taken along a section transverse or radial to the longitudinal axis that is formed and selected to enable the elongated body to be deformed or bent along a selected length along its longitudinal axis into a bent portion having a bend radius of curvature of up to as little as at least about 2.5 inches at a bend angle of about ninety degrees wherein the bent portion can remain attached to the base at the bend angle of about ninety degrees with the bend radius of up to as little as at least about 2.5 inches;

the second layer being disposed on a distal undersurface of the first body layer and formed into a configuration that is readily attachable to and detachable from a complementary receiving groove formed in the base.

In such an embodiment the configuration of the first body layer is typically formed and selected to enable the bend radius to be up to as little as at least about 1.5 inches and preferably up to as little as at least about 1.0 inches.

In such an embodiment the elongated body has a stable width in a relaxed state and has a stressed transverse width along the bent portion, the stressed transverse width remaining about the same as the stable transverse width. Most preferably the stressed tranverse width is no more than about 0.05 inches wider, and typically no more than about 0.03 inches wider, than the relaxed state transverse width.

In such an embodiment, the first body layer typically has a configuration taken along a section transverse or radial to the longitudinal axis that includes an enclosed center aperture embedded within the first body layer and a pair of open recesses embedded within the first body layer that are disposed laterally adjacent the center aperture, the aperture and recesses extending longitudinally along the longitudinal axis of the elongated body. The center aperture typically has a configuration that is generally T-shaped having a widened head portion that is curved along a top end of the center aperture and a leg portion that extends distally from the head portion toward the distal undersurface, the lateral recesses being disposed within body layer on opposite lateral sides of the center aperture.

In another aspect of the invention there is provided an impact absorbing and resistant bumper comprising:

an elongated body comprised of at least two extruded or molded layers of polyvinyl chloride polymeric materials, the elongated strip having a longitudinal axis and being resistant to impact, the elongated strip comprising:

a first body layer comprised of a first polyvinyl chloride polymeric material having a first selected degree of hardness;

a second layer of a second polyvinyl chloride polymeric material having a second degree of hardness;

wherein the layers are extruded or molded simultaneously and adhered to each other along the elongated axis of the strip, the elongated body having a body configuration taken along a section transverse or radial to the longitudinal axis that forms an enclosure having a curved outer surface and an open undersurface accessible for reversibly attaching to a base;

the first body layer being extruded or molded such that it has a configuration taken along a section transverse or radial to the longitudinal axis that has a transverse center and a stable transverse width when the elongated body is in a relaxed state and includes an enclosed center aperture and a pair of lateral recesses embedded within the first body layer extending along and through the longitudinal length of the elongated body, the lateral recesses being disposed within body layer on opposite lateral sides of the center aperture;

the second layer being disposed on a distal undersurface of the first body layer and formed into a configuration that is force fittable into attachment with a complementary groove formed in the base such that the elongated body is reversibly attachable to and detachable from the base.

In such an embodiment the first layer preferably comprises greater than about 3% by weight of a plasticizer and the second layer comprises less than about 0.3% of a plasticizer.

In such an embodiment the first polyvinyl chloride material has preferably been melted at least once prior to being extruded into the elongated body.

In such an embodiment, the center aperture, the lateral recesses and the second layer have a selected size and configuration and the center aperture and lateral recesses are disposed within and through the first body layer in an arrangement that are selected to enable the elongated body to be deformed or bent along a selected length along its longitudinal axis into a bent portion having a bend radius of curvature of up to as little as at least about 2.5 inches at a bend angle of about ninety degrees wherein the bent portion can remain attached to the base at the bend angle of about ninety degrees with the bend radius of up to as little as at least about 2.5 inches (typically up to as little as up to about 1.5 inches, preferably up to as little as about 1.0 inches).

In such an embodiment, the center aperture, lateral recesses and second layer preferably have a selected size and configuration and the center aperture and lateral recesses are disposed within and through the first body layer in an arrangement that are selected to enable the elongated body to be deformed or bent along a selected length along its longitudinal axis into a bent portion having a bend radius of curvature of up to as little as at least about 2.5 inches (typically up to as little as up to about 1.5 inches, preferably up to as little as about 1.0 inches) at a bend angle of about ninety degrees, the bent portion having a stressed transverse width, wherein the stressed transverse width along the bent portion remains about the same as the stable transverse width when the elongated body is in a relaxed state. Most preferably the stressed tranverse width is no more than about 0.05 inches wider, and typically no more than about 0.03 inches wider, than the relaxed state transverse width.

In another aspect of the invention there is provided an impact absorbing and resistant bumper for attachment to a base comprising:

an elongated body comprised of at least three extruded or molded layers of polyvinyl chloride polymeric materials, the elongated body having a longitudinal axis and being resistant to impact, the elongated strip comprising:

a first body layer comprised of a first polyvinyl chloride polymeric material having a first selected degree of hardness;

a second layer of a second polyvinyl chloride polymeric material having a second degree of hardness greater than the first degree of hardness of the first polymeric material;

a third layer of a third polyvinyl chloride polymeric material having a third degree of hardness that is greater than the first degree of hardness of the first polymeric material;

wherein the layers are extruded or molded simultaneously and adhered to each other along the elongated axis of the strip, the elongated body having a body configuration taken along a section transverse or radial to the longitudinal axis that forms an enclosure having a curved outer surface and an open undersurface accessible for reversibly attaching to a base;

the first body layer being extruded or molded such that it has a configuration taken along a section transverse or radial to the longitudinal axis that comprises a center aperture and a pair of lateral recesses extending along and through the longitudinal length of the elongated body, wherein the center aperture has a configuration taken along a section transverse or radial to the longitudinal axis that is generally T-shaped having a widened head portion that is curved along a top end of the center aperture and a leg portion that extends distally from the head portion toward the distal undersurface, the lateral recesses being disposed within body layer on opposite lateral sides of the center aperture;

the second layer being disposed on a distal undersurface of the first body layer and formed into a configuration that mates with a complementary groove formed in the base such that the elongated body is reversibly attachable to and detachable from the base;

the third layer being extruded onto and forming the curved outer surface of the elongated body.

In such an embodiment the first and third layers of polymeric material contain greater than about 3% of a plasticizer and the second layer of polymeric material contains less than about 0.3% of a plasticizer.

The first layer typically comprises at least about 80% and most preferably about 90% by weight of the elongated body.

In such an embodiment the first layer has preferably been melted at least once prior to be extruded or molded into the elongated body and the third layer has not been melted prior to being melted and extruded together with the first and second layers.

In such an embodiment, the center aperture and the lateral recesses and the second layer have a selected size and configuration and the center aperture and lateral recesses are disposed within and through the first body layer in an arrangement that are selected to enable the elongated body to be deformed or bent along a selected length along its longitudinal axis into a bent portion having a bend radius of curvature of up to as little as at least about 2.5 inches at a bend angle of about ninety degrees wherein the bent portion can remain attached to the base at the bend angle of about ninety degrees with the bend radius of up to as little as at least about 2.5 inches (typically up to as little as up to about 1.5 inches, preferably up to as little as about 1.0 inches).

In such an embodiment, the center aperture, the lateral recesses and the second layer preferably have a selected size and configuration and the center aperture and lateral recesses are disposed within and through the first body layer in an arrangement that are selected to enable the elongated body to be deformed or bent along a selected length along its longitudinal axis into a bent portion having a bend radius of curvature of up to as little as at least about 2.5 inches (typically up to as little as up to about 1.5 inches, preferably up to as little as about 1.0 inches) at a bend angle of about ninety degrees, the bent portion having a stressed transverse width, wherein the stressed transverse width along the bent portion remains about the same as the stable transverse width when the elongated body is in a relaxed state. Most preferably the stressed tranverse width is no more than about 0.05 inches wider, and typically no more than about 0.03 inches wider, than the relaxed state transverse width.

In another aspect of the invention there is provided an impact absorbing and resistant bumper for mounting on a base comprising:

an elongated body having a selected radial or transverse width being comprised of at least three extruded or molded layers of polyvinyl chloride polymeric materials, the elongated body having a longitudinal axis and being resistant to impact, the elongated body comprising:

a first body layer comprised of a first polyvinyl chloride polymeric material having a first selected degree of hardness, the first body layer comprising at least about 80% by weight of the elongated body and containing 3% or more of a plasticizer material;

a second layer of a second polyvinyl chloride polymeric material having a second degree of hardness greater than the first degree of hardness and containing less than about 0.3% of a plasticizer material;

a third layer of a third polyvinyl chloride polymeric material having a third degree of hardness greater than the first degree of hardness and containing 3% or more of a plasticizer material;

wherein the layers are extruded or molded simultaneously and adhered to each other along the elongated axis of the strip, the elongated body having a body configuration taken along a section transverse or radial to the longitudinal axis that forms an enclosure having a curved outer surface and open undersurface accessible for reversibly attaching to a base;

the first body layer being extruded or molded such that it has a configuration taken along a section transverse or radial to the longitudinal axis that comprises a center aperture and a pair of lateral recesses extending along and through the longitudinal length of the elongated body, wherein the center aperture has a configuration taken along a section transverse or radial to the longitudinal axis that is generally T-shaped having a widened head portion that is curved along a top end of the center aperture and a leg portion that extends distally from the head portion toward the distal undersurface, the lateral recesses being disposed within body layer on opposite lateral sides of the center aperture;

the second layer being disposed on a distal undersurface of the first body layer and formed into a configuration that is readily attachable to and detachable from a complementary groove formed in the base;

the third layer being extruded onto and forming the curved outer surface of the elongated body;

the first polyvinyl chloride polymeric material being melted at least once prior being extruded into the elongated body;

the third polyvinyl chloride polymeric material not being melted prior to being extruded into the elongated body.

BRIEF DESCRIPTION OF THE DRAWINGS

FIG. 1 is a top/perspective view of a portion of an elongated bumper according to the invention showing a solid strip form extruded body of material comprising a top outer layer of relatively hard polymer virgin polyvinyl material containing a plasticizer, an inner or intermediate body layer of relatively soft or less hard and more bendable polyvinyl polymer material containing plasticizer that has been melted at least once prior to being extruded and an undersurface strip of relatively hard, shrink resistant polyvinyl polymer material that does not contain plasticizer or contains only trace or relatively small amount of plasticizer, the elongated body 10 being mounted via a snap fit on a base 20 shown extending longitudinally beyond the proximal end of the strip;

FIG. 2 is a top/perspective exploded view of the FIG. 1 bumper showing the geometrical configuration of a central enclosed longitudinal T or fan-shaped aperture bordered on its lateral sides by a pair of opposing longitudinal recesses in the internal body layer and an end cap component 11 and the snap-on and snap-off relationship of the bumper relative to a base member onto which the bumper is readily mountable and from which the base member is readily removable;

DETAILED DESCRIPTION

Figure 3:
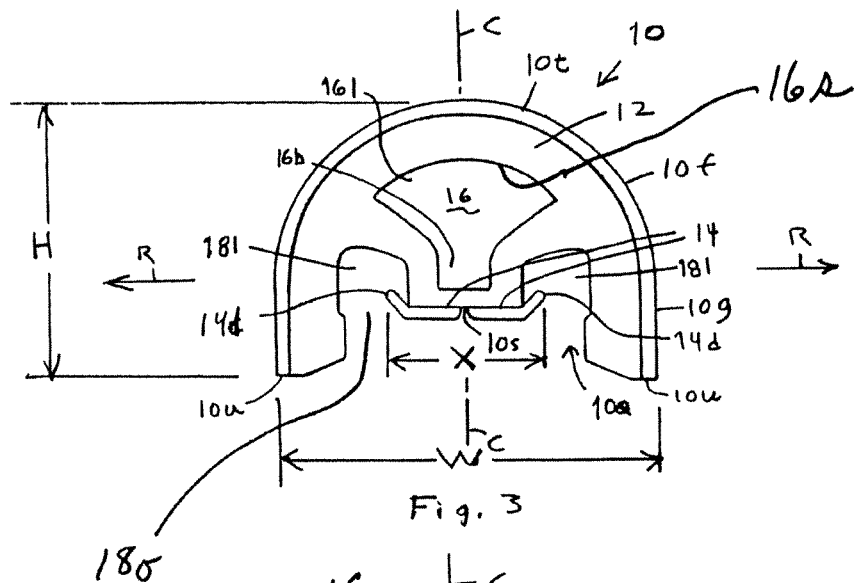
FIG. 3 is a sectional view of the three layer embodiment of a bumper according to the invention as shown in FIGS. 1, 2 taken along a transverse or radial plane relative to the longitudinal axis A of the bumper configuration of FIGS. 1, 2.

FIGS. 1 and 2 show a portion of a length of an elongated bumper 10 having a longitudinal axis A. The bumper 10 is comprised of an outer extruded polymer layer 10$t$ formed on the outside surface of a larger body layer 12 and a stiff underside layer 14 that is formed and adhered to the undersurface of the body layer 12 along the longitudinal length of the layer 12. The outer layer 10$t$ and the body layer 12 typically comprise a polymeric material such as polyvinyl chloride and a plasticizer material. The plasticizer material typically comprises from about 3 to about 30% by weight of the layers. The outer layer 10$t$ is preferably a virgin material that has not been previously been melted prior to its being extruded in an extrusion process which necessarily requires melting of the polymer material. The body layer 12 typically comprises a polymeric material that has been melted at least once prior to its being melted in the extrusion process that forms the bumper 10. The polymeric materials of which the layers 10$t$, 12 and 14 are comprised is typically a polyvinyl chloride material.

As used herein the phrase "melted for the first time" or "first melted" or the like means that the polymer material has not been previously melted during an extrusion or molding process, it being understood that the starting polymer material may have been previously in a molten form as a result of its having been produced/manufactured in the first instance.

The polymeric material of which the body layer 12 is comprised preferably has a hardness durometer of between about 82 and about 88 Shore D. The polymeric material of which the rigid underlayer 14 is comprised preferably has a hardness durometer of between about 66 and about 80 Shore A. The polymeric material of which the outer layer 10$t$ is comprised preferably has a durometer hardness of between about 84 and about 86 Shore D. The hardness durometer of the of the rigid underlayer 14 is hard enough to enable the relatively thin strips 14 to be deformed and press or snap fit into a pair of receiving recesses 32 on the base 30 and maintain their rigidity so as to reliably and securely hold the strip 10 to the base 30.

The mass of the polymeric material that comprises the body layer 12 preferably comprises about 80% or more, most preferably about 85% or more, by weight of the mass of the entire elongated bumper 10. Similarly the volume of the polymeric material that comprises the body layer 12 preferably comprises about 80% or more, most preferably about 85% or more, by volume of the volume of the entire elongated bumper 10.

The elongated bumper body 10 is formed into a configuration comprising approximately a semicircle or semi oval or the like having a curved and smooth upper or outer surface 10$f$ that continues and extends into relatively flat and smooth opposing left and right side outer lateral or side surfaces 10$g$ enclosing beneath such surfaces a body layer 12 having a longitudinal aperture 16 and lateral recesses 18 and a rigid layer 14 attached to the distal undersurface of the body layer. The outer smooth surfaces 10$f$ and 10$g$ terminate at distal lateral underside positions or edges 10$u$ to form a manually accessible open underside aperture 10Q that exposes the undersurfaces 10$s$ of the body layer 12 and the rigid underside layer 14 such that these surfaces or components can be mated or engaged with a complementary base 30 or other mounting surface or structure (not shown). As shown the stiff highly rigid underside layer of material 14 is adhered to the distalmost undersurface 10$s$ of the body layer 12.

As shown, the body layer 12 is formed and extruded to contain an enclosed aperture 16 disposed in the radial or transverse center of the body layer 12 along a direction that is radial or transverse to the longitude A of the strip 10. The aperture 16 extends along the longitudinal length A of the device 10. The aperture 16 has a fan-like or T-shaped configuration having a laterally widened top or head portion 16$l$ and a bottom narrowed portion 16$b$ continuing distally from the top widened portion 16$l$. In the embodiment shown the top end of the head portion 16$l$ has a curved geometry, contour or configuration that extends from side-to-side within the body layer 12 in a direction transverse or radial to the longitude or axis A. A pair of lateral recesses 18 are formed within the body layer 12 and also extend through and along the longitudinal axis A on and adjacent to opposing lateral sides of the center aperture 16. As shown the recesses 18 have recess extensions 18$l$ that extend toward but are disposed distally below and adjacent the head portion 16$l$ of the center aperture 16. The recesses 18 are surrounded on three sides by the polymeric material of which the body layer 12 is comprised, the recesses comprising a channel or enclosure having a distally or downwardly facing open passage or opening 18o facing the distal underside of the bumper. For purposes of definition herein, "distal" means disposed closer to, nearer to or approaching/facing the entry to the undersurface aperture or opening 10Q, and "proximal" means disposed closer to, nearer to or approaching the upper top curved surface 10f of the device 10. As shown the lateral recesses 18l extend proximally toward the top surface 10f above the narrowed portion 16b of the center aperture. Also as shown the lateral recesses 18, 18l extend and are disposed further laterally or radially R away from the center C of the device 10 than the fully enclosed aperture 16 extends within the body layer 12 and further laterally R beyond the furthest lateral point of extension of the center aperture 16. Thus the bumper 10 has a center C, a longitudinal axis or longitude A, a lateral axis R and proximal (more toward the top 10f surface) and distal (more toward the undersurface entry 10Q) directions, axes or orientations.

Figure 6:
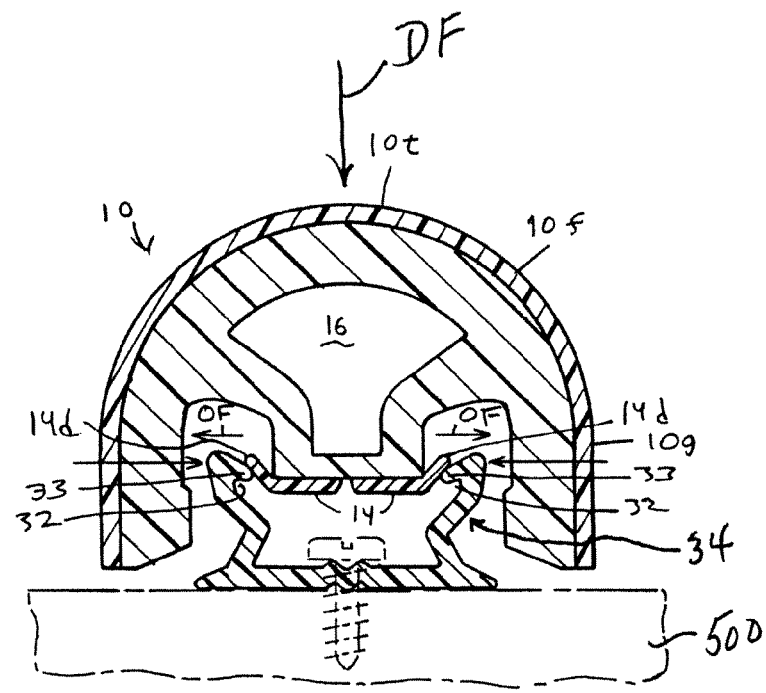
FIG. 6 is a cross-sectional view of a bumper positioned relative to a base member immediately prior to application of downward force DF on the top outer surface of the bumper to cause the underlayer 14 of the bumper to snap-on-engage with the recesses 32 of the mounting arms 34.
Figure 7:
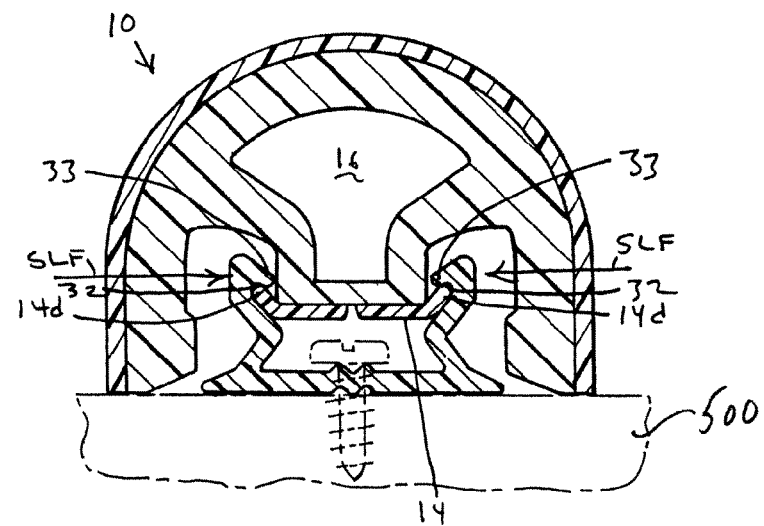
FIG. 7 is a cross-sectional view of a bumper snapped into mounting engagement with the base component of FIGS. 5, 6 by application of the downward force DF, the lateral or radial detents or fingers 14$d$ of the underlayer 14 being in snapped-in engagement with the receiving recesses 32 of the mounting arms 34.
Figure 8:
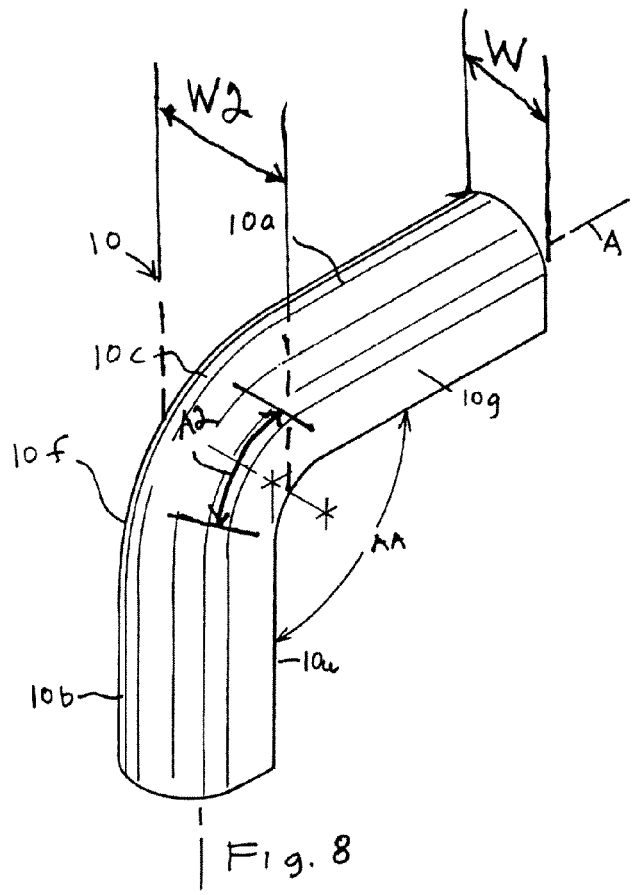
FIG. 8 is a top perspective view of an elongated length portion of an extruded multi-layered bumper that is manually bent to form a 90 degree angle between the axis of a first leg and the axis of a second leg of the of the overall length of the bumper strip as shown.
Figure 9:
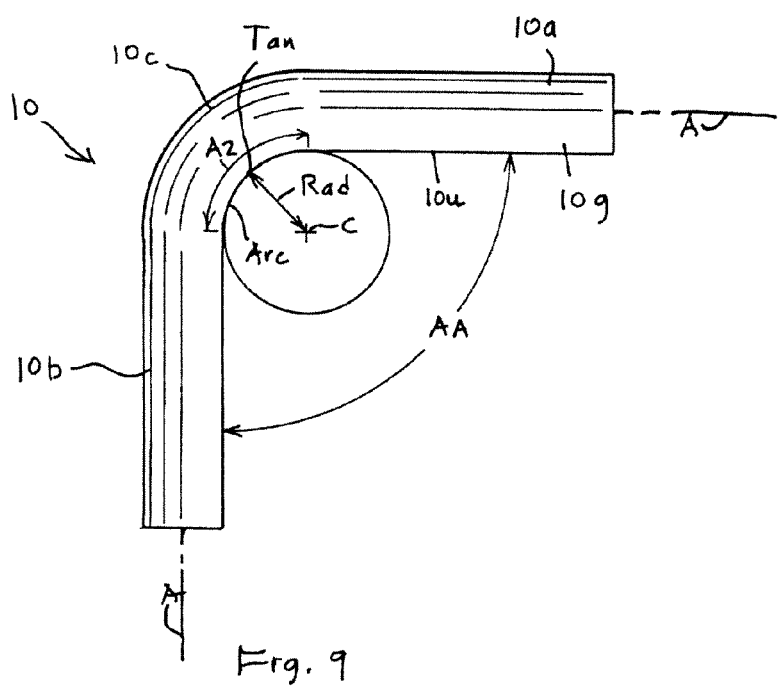
FIG. 9 is a side schematic view of the bent portion of the elongated bumper of FIG. 8 showing the radius Rad of curvature of the 90 degree bend made in the length portion of the FIG. 8 bumper as shown.

The configuration of and arrangement of the center aperture 16 and recesses 18 relative to each other within the matrix of body layer 12 enables the device 10 to bent to a ninety degree angle having a radius of curvature R (as defined herein) of up to as little as 2.5 inches (typically up to 1.5 and preferably 1.0 inches), FIGS. 8, 9. As shown in the examples of FIGS. 1-9, the center aperture is typically generally T-shaped having a curved upper or proximal surface 16s. The lateral recesses 18 are disposed laterally or radially on opposing or opposite lateral sides of the center aperture 16 extending laterally or radially R further away LE from the center C, FIGS. 3, 4 than the center aperture 16 extends within the matrix of the body layer 12. The center aperture C can have alternative geometrical configurations such as oval, rectangular, oblong or the like. The recesses 18 include a distally or downwardly facing opening or passage 18o.

As shown in FIGS. 1, 2, 6, 7 the bumper 10 of the invention is mountable on a base member 30 which in turn is attachable by conventional means (such as screws, nails, adhesive, staples) to an exposed surface of, for example, furniture, fixtures, wells, cabinets, stands, shelves, walls or other structures generally designated 500 that are typically disposed within or around a building or room such as a retail store where patrons typically push or roll baskets or carts or ladders or stairs around on the floor and which can impact or engage with the surface of the furniture. Thus a base structure 30 such as shown in the embodiments depicted in the Figures may be attached at strategic positions on the walls, fixtures, furniture and the like in a room such as a retail store and a bumper 10 according to the invention attached or affixed to the base such that carts or baskets used within the space impact the outside surfaces 10f, 10g of the bumper 10 which absorbs the impact and force of the impacting cart, basket or other structure being moved around on the floor of the room.

The base structure 30 and the rigid layer 14 are formed and adapted to reversibly attach to each other by way of mechanically snapping, fitting or attaching the rigid layer 14 of the bumper 10 onto a complementary receiving and mating mechanism on the base. As shown in the specific but not limiting embodiments shown in the Figures, the base structure 30 comprises a mounting base or frame 36 having spring loaded reversibly bendable arms 34 that can be urged or bent in a radial direction R under a force OF that is created when the detents 14d of the rigid layer 14 are inserted into and between the opposing arms 34. The arms resist the outward force OF by way of a spring load force that is created and contained within the connection or fusion point 34a between the frame 36 and the arm 34. The outward force OF is created as a result of the distance X between the lateral end points of the detents 14d being greater than the distance D between the centermost points of the arms 34. When the layer 14 is forcibly inserted OF between the arms 34 the arms 34 deform or bend radially outwardly and the detents 14d are snap fit into complementary recesses 32 that are formed by fingers 33 disposed at the terminal ends of arms 34. The snap fit of the detents into the recesses 32 of the fingers occurs because the arms 34 have a spring-load force SLF built into the polymeric body of the connection 34a that mounts the arms 34 to the frame 36. The spring load force inherent in the polymeric matrix or body of the connection 34 thus reacts against the force OF created by insertion of the detents between the fingers 33. The detents 14 are disposed to face proximally upwardly and the recesses are disposed to face distally downwardly so that once the detents 34a are snap fit into the recesses and are held therein by an interference fit between the detents and the fingers. The spring force SLF maintains the arms 34 in a position as shown in FIG. 2 such that the bumper 10 is firmly secured to the base by way of the detents being snap fit into the recesses 32 and held there against distal movement of the bumper away from the frame 36 by interference of the detents 34a with the fingers 33. The bumper 30 can be manually removed by forcibly pulling the top end 10f, 10g in a direction distally or upwardly away from the frame 36. Such forcible pulling, when sufficiently forcible, will cause the detents 34 to deform in a downward/distal direction within the recesses 32 of the fingers 33 and eventually disengage from the recesses 32 such that the interference fit of the detents within the recesses is reversed. As shown the rigid layer 14 is attached to and formed on the distal-most disposed portion of the undersurface 10s of the body layer 12 along or at about the radial center C of the bumper 10.

In an alternative embodiment, the base 30 structure can be formed as an integral formation with and to the surface to which the bumper is to be attached. In typical embodiments, the base 30 is comprised of a polymeric material that is highly rigid similar to or the same as the highly rigid or stiff property of the bumper layer 14. Thus both structures 14 and 30 typically have a stiffness or hardness durometer of between about 66 and about 80 Shore A such that any deformation of the base structure or the detents results in a high spring resistant force created within the matrix of the polymer of which structures 14 and 30 are comprised. As with the layer 14, the base 30 can be comprised of a polyvinyl chloride polymer that contains less than about 0.3% plasticizer.

Figure 4:
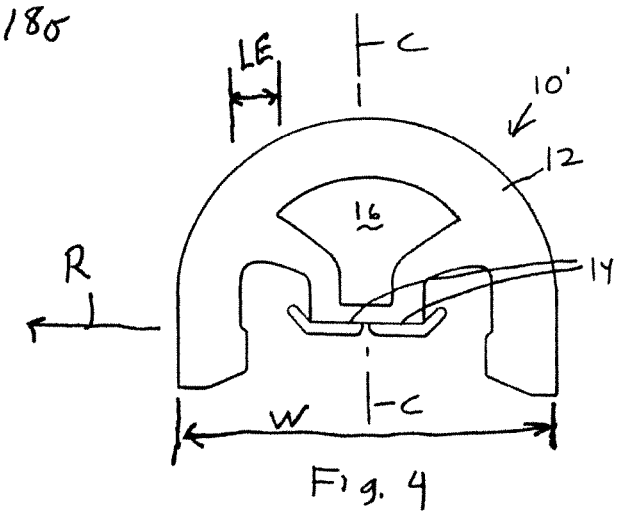
FIG. 4 is a sectional view of a two layer embodiment of a bumper according to the invention that does not have a separate outer layer but rather comprises only two layers, a body layer and an undersurface mounted rigid layer.
Figure 5:
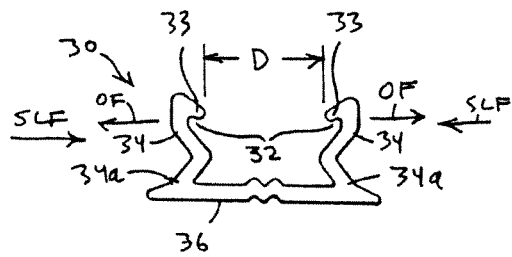
FIG. 5 is a sectional view of the base component shown in FIGS. 1, 6, 7.

The bumper 10 can be comprised of at least two layers, a body layer 12 and an underlayer 14, FIG. 4 or at least three layers, 12, 14 and 10t, FIGS. 1-3, 6, 7 as described above.

As shown, the elongated body 10 has a stable transverse or radial width W when the elongated body is in a relaxed state when the body 10 has not been deformed or bent and the axis A is substantially linear. W typically ranges between about 0.8 and about 1.15 inches. As shown in FIGS. 8, 9 a bumper 10 having a first leg portion 10a and second leg portion 10b can be deformed or bent around an intermediate bend or bent portion 10c by 90 degrees. The bent portion 10c is not relaxed but instead stressed such that the side surfaces 10g are being pressured to flare radially outwardly from the center C to a greater transverse width W2 than the relaxed state transverse width W. As shown in FIG. 9 when a selected portion 10c of the bumper 10 is bent by 90 degrees along a certain axial length A2, an arc, Arc, is formed along the underside edge 10u of the bent portion 10c, the bent or bend portion 10c being defined by and extending along the portion of the longitudinal axis A having axial length A2 as shown in FIG. 9. The radius of curvature, Rad, of the bent portion 10c of the elongated body 10 is measured from a tangential point, Tan, taken on the underside edge 10u of the arc, Arc, (formed on account of the bend 10c) and the center CC of a circle whose circumference includes the arc, Arc, of the bent portion 10c as shown in FIG. 9. The configuration, geometry and disposition of the aperture 16 and recesses 18 are selected and built into the body layer 12 in combination with the selection of the durometer, hardness/softness of the body layer 12 such that an elongated bumper strip 10 can be bent and deformed over axial length A2 along the longitudinal axis A by an angle AA of about 90 degrees that has a radius of curvature, Rad, that is up to as little as at least about 2.5 inches, typically up to as little as at least about 1.5 inches and can be up to as little as at least about 1.0 inches. The transverse width W2 of the elongated body along the axial length A2 of the stressed bent portion 10c remains about the same as the transverse width W of the non-stressed, non-bent portions of the elongated body in its relaxed state. Preferably W2 is no more than about 0.05 inches, and typically no more than about 0.03 inches greater in width than to W.

Such radius of curvature, Rad, for example as little as about 0.9 to about 1.1 inches, can be manually formed in an elongated body 10 while attaching the body 10 to a base 30 in a manner as shown and described with reference to FIGS. 6, 7 such that the detents 14d will remain engaged with the complementary attachment mechanism 32, 33 of the mounting arms 34 along the axial length A2 of the bend portion 10c even while the bent portion 10c is under the stress of being bent 90 degrees to a curve having a radius of curvature of as little as about 2.5, about 1.5 or about 1.0 inches. Such a small radius of curvature, Rad, at 90 degrees is made possible and enabled by the preselected design, relative size and positioning of center aperture 16 and recesses 18 and the hardness and geometry of the body layer 12 such that the lateral surfaces 10f of the device 10 and the body layer 12 will remain contained substantially within the transverse or radial width W of the elongated body in its normally relaxed state and will not substantially extend beyond or outside the radial width W.

As described above, the configuration and arrangement of the aperture 16 and recesses 18 of the body layer 12 are selected so as to enable the elongated body to be bent into a 90 degree bend portion 10c having a bend radius, Rad, of as little as at least about 2.5 or 1.5 or 1.0 inches without the body layer extending or deforming substantially outside the transverse or radial width, W, of the relaxed state of the bumper, FIGS. 3, 4, of the elongated body at any axial position along the axial length, A2, of the bend portion 10c.

What is claimed is:

1. An impact absorbing and resistant bumper for mounting on a base structure, the bumper comprising:
    an elongated body having a longitudinal axis and being resistant to impact, the elongated body comprising:
    a first body layer comprised of a first polymeric material having a first selected degree of hardness;
    a second layer of a second polymeric material having a second degree of hardness that is greater than the first degree of hardness of the first polymeric material;
    wherein the first body layer and the second layer are extruded or molded simultaneously and adhered to each other to extend along the elongated axis of the body, the elongated body having a body configuration taken along a section transverse or radial to the longitudinal axis that forms an enclosure having a continuous curved outer or upper exposed surface and an open undersurface accessible for reversibly attaching to the base;
    the first body layer having a transverse center, a stable transverse width when the elongated body is in a relaxed state and includes an enclosed center aperture embedded within the first body layer and a pair of open recesses embedded within the first body layer disposed laterally adjacent the center aperture, the aperture and recesses extending longitudinally along the longitudinal axis of the elongated body;
    the second layer being disposed on a distal undersurface of the first body layer and formed into a configuration that is readily attachable to and detachable from the base.

2. The bumper of claim 1 wherein the center aperture and the lateral recesses have a selected size and configuration and are disposed within and through the first body layer in an arrangement that are selected to enable the elongated body to be deformed or bent along a selected length along its longitudinal axis into a bent portion having a bend radius of curvature of up to as little as at least about 2.5 inches at a bend angle of about ninety degrees wherein the bent portion can remain attached to the base at the bend angle of about ninety degrees with the bend radius of up to as little as about 2.5 inches.

3. The bumper of claim 2 wherein the bend radius of curvature is up to as little as about 1.5 inches.

4. The bumper of claim 2 wherein the bend radius of curvature is up to as little as about 1.0 inches.

5. The bumper of claim 1 wherein the center aperture and the lateral recesses have a selected size and configuration and are disposed within and through the first body layer in an arrangement that are selected to enable the elongated body to be deformed or bent along a selected length along its longitudinal axis into a bent portion having a bend radius of curvature of up to as little as about 2.5 inches, the bent portion having a stressed transverse width, wherein the stressed transverse width along the bent portion remains about the same as the stable transverse width when the elongated body is in a relaxed state.

6. The bumper of claim 5 wherein the stressed transverse width is no more than about 0.05 inches wider than the relaxed state transverse width.

7. The bumper of claim 1 wherein the center aperture has a configuration taken along a section transverse or radial to the longitudinal axis that is generally T-shaped having a widened head portion that is curved along a top end of the center aperture and a leg portion that extends distally from the head portion toward the distal undersurface, the lateral recesses being disposed within body layer on opposite lateral sides of the center aperture.

8. The bumper of claim 1 wherein the first body layer contains a plasticizer in an amount of about 3% or more by weight relative to the first polymeric material and is selected to impart a degree of hardness and bendability to the first body layer that enables the elongated body to be readily bent along its longitudinal axis.

9. The bumper of claim 8 wherein the second layer of polymeric material contains less than about 1% of a plasticizer and has a stiffness or rigidity selected to enable the second layer to engage with and snap fit securely into the complementary groove formed within the base and maintain the bumper attached to the base at a bend angle of ninety degrees having a bend radius of curvature up to as little as about 2.5 inches.

10. The bumper of claim 1 further comprising an outer layer comprised of a third polymeric material containing a plasticizer in an amount of about 3% or more, the outer layer being extruded onto and forming the curved outer surface of the elongated body.

11. The bumper of claim 10 wherein the first polymeric material has been melted at least once prior to extrusion and the third polymeric material has not been melted prior to melting and extrusion together with the first and second polymeric materials.

12. The bumper of claim 1 wherein the lateral recesses extend laterally or radially away from the transverse center a greater distance than the center aperture extends.

13. An impact absorbing and resistant bumper readily attachable to and detachable from a base, the impact absorbing and resistant bumper comprising:
  an elongated body having a longitudinal axis and being resistant to impact, the elongated body comprising:
  a first body layer comprised of a first polymeric material having a first selected degree of hardness;
  a second layer of a second polymeric material having a second degree of hardness greater than the degree of hardness of the first polymeric material;
  wherein the first body layer and the second layer are extruded or molded simultaneously and adhered to each other along the elongated axis of the strip, the elongated body having a body configuration taken along a section transverse or radial to the longitudinal axis that forms an enclosure having a curved outer surface and an open undersurface accessible for reversibly attaching to a base;
  the first body layer having a configuration taken along a section transverse or radial to the longitudinal axis that has a transverse center, a stable transverse width when the elongated body is in a relaxed state and includes an enclosed center aperture embedded within the first body layer and a pair of open recesses embedded within the first body layer that are disposed laterally adjacent the center aperture, the aperture and recesses extending longitudinally along the longitudinal axis of the elongated body;
  the center aperture having a configuration that is generally T-shaped having a widened head portion that is curved along a top end of the center aperture and a leg portion that extends distally from the head portion toward the distal undersurface, the lateral recesses being disposed within the first body layer on opposite lateral sides of the center aperture;
  the second layer being disposed on a distal undersurface of the first body layer and formed into a configuration that mates with a complementary groove formed in the base such that the elongated body is reversibly attachable to and detachable from the base.

14. The bumper of claim 13 wherein the center aperture and the lateral recesses have a selected size and configuration and are disposed within and through the first body layer in an arrangement that are selected to enable the elongated body to be deformed or bent along a selected length along its longitudinal axis into a bent portion having a bend radius of curvature of up to as little as at least about 2.5 inches at a bend angle of about ninety degrees wherein the bent portion can remain attached to the base at the bend angle of about ninety degrees with the bend radius of up to as little as at least about 2.5 inches.

15. The bumper of claim 13 wherein the center aperture and the lateral recesses have a selected size and configuration and are disposed within and through the first body layer in an arrangement that are selected to enable the elongated body to be deformed or bent along a selected length along its longitudinal axis into a bent portion having a bend radius of curvature of up to as little as at least about 2.5 inches at a bend angle of about ninety degrees, the bent portion having a stressed transverse width, wherein the stressed transverse width along the bent portion remains about the same as the stable transverse width when the elongated body is in a relaxed state.

16. The bumper of claim 15 wherein the stressed tranverse width is no more than about 0.05 inches wider than the relaxed state transverse width.

17. The bumper of claim 13 further comprising an outer layer comprised of third polymeric material, the outer layer being extruded onto and forming the curved outer surface of the elongated body, the first and third polymeric materials containing about 3% or more by weight of a plasticizer material and the second polymeric material containing less than about 0.3% of a plasticizer material.

18. The bumper of claim 13 wherein the first polymeric material has been melted at least once prior to melting and extrusion and the second and third polymeric materials have not been melted prior to melting and extrusion.

19. An impact absorbing and resistant bumper for mounting on a base structure, the bumper comprising:
  an elongated body having a longitudinal axis and being resistant to impact, the elongated body comprising:
  a first body layer comprised of a first polymeric material having a first selected degree of hardness;
  a second layer of a second polymeric material having a second degree of hardness that is greater than the first degree of hardness of the first material;
  wherein the first body layer and the second layer are extruded or molded simultaneously and adhered to each other to extend along the elongated axis of the body, the elongated body having a body configuration taken along a section transverse or radial to the longitudinal axis that forms an enclosure having a continuous curved outer or upper surface and an open undersurface accessible for reversibly attaching to a base;
  the first body layer having a configuration taken along a section transverse or radial to the longitudinal axis that is formed and selected to enable the elongated body to be deformed or bent along a selected length along its longitudinal axis into a bent portion having a bend radius of curvature of up to as little as about 2.5 inches at a bend angle of about ninety degrees wherein the bent portion can remain attached to the base at the bend angle of about ninety degrees with the bend radius of up to as little as about 2.5 inches;
  the second layer being disposed on a distal undersurface of the first body layer and formed into a configuration that is readily attachable to and detachable from a complementary receiving groove formed in the base.

20. The bumper of claim 19 wherein the bend radius of curvature is up to as little as about 1.5 inches.

21. The bumper of claim 19 wherein the bend radius of curvature is up to as little as about 1.0 inches.

22. The bumper of claim 19 wherein the first body layer has a configuration taken along a section transverse or radial to the longitudinal axis that includes an enclosed center aperture embedded within the first body layer and a pair of open recesses embedded within the first body layer that are disposed laterally adjacent the center aperture, the aperture and recesses extending longitudinally along the longitudinal axis of the elongated body.

23. The bumper of claim 22 wherein the center aperture has a configuration that is generally T-shaped having a widened head portion that is curved along a top end of the center aperture and a leg portion that extends distally from the head portion toward the distal undersurface, the lateral recesses being disposed within the first body layer on opposite lateral sides of the center aperture.

24. An impact absorbing and resistant bumper for mounting on a base, the impact absorbing and resistant bumper comprising:

an elongated body having a selected radial or transverse width in a relaxed state, the elongated body having a longitudinal axis and being resistant to impact, the elongated body comprising:

a first body layer comprised of a first polyvinyl chloride polymeric material having a first selected degree of hardness, the first body layer comprising at least about 80% by weight of the elongated body and containing 3% or more of a plasticizer material;

a second layer of a second polyvinyl chloride polymeric material having a second degree of hardness greater than the first degree of hardness and containing less than about 0.3% of a plasticizer material;

a third layer of a third polyvinyl chloride polymeric material having a third degree of hardness greater than the first degree of hardness and containing 3% or more of a plasticizer material;

wherein the first body layer, the second layer, and the third layer are extruded or molded simultaneously and adhered to each other along the elongated axis of the strip, the elongated body having a body configuration taken along a section transverse or radial to the longitudinal axis that forms an enclosure having a curved outer surface and open undersurface accessible for reversibly attaching to the base;

the first body layer being extruded or molded to have a configuration taken along a section transverse or radial to the longitudinal axis enclosing a center aperture, the first body layer comprising a pair of lateral recesses extending along the longitudinal axis of the elongated body, wherein the center aperture is generally T-shaped having a widened head portion that is curved along a top end of the center aperture and a leg portion that extends distally from the head portion toward the distal undersurface, the lateral recesses being disposed within the first body layer on opposite lateral sides of the center aperture;

the second layer being disposed on a distal undersurface of the first body layer and formed into a configuration that is readily attachable to and detachable from a complementary groove formed in the base;

the third layer being extruded onto and forming the curved outer surface of the elongated body; the first polyvinyl chloride polymeric material being melted at least once prior being extruded into the elongated body;

the third polyvinyl chloride polymeric material not being melted prior to being extruded into the elongated body.

* * * * *